(12) United States Patent
Langer et al.

(10) Patent No.: US 9,379,826 B2
(45) Date of Patent: Jun. 28, 2016

(54) CALIBRATION OF A TRANSMITTER WITH INTERNAL POWER MEASUREMENT

(75) Inventors: Andreas Langer, Unterschleissheim (DE); Thomas Bruder, Grafing (DE)

(73) Assignee: Intel Deutschland GmbH, Neubiberg (DE)

( * ) Notice: Subject to any disclaimer, the term of this patent is extended or adjusted under 35 U.S.C. 154(b) by 261 days.

(21) Appl. No.: 13/075,505

(22) Filed: Mar. 30, 2011

(65) Prior Publication Data

US 2012/0250534 A1    Oct. 4, 2012

(51) Int. Cl.
  H04B 17/00   (2015.01)
  H04B 17/13   (2015.01)
  H04B 17/11   (2015.01)
  H04B 17/19   (2015.01)

(52) U.S. Cl.
  CPC .............. H04B 17/13 (2015.01); H04B 17/11 (2015.01); H04B 17/19 (2015.01)

(58) Field of Classification Search
  None
  See application file for complete search history.

(56) References Cited

U.S. PATENT DOCUMENTS

| | | | |
|---|---|---|---|
| 6,253,007 B1 | 6/2001 | Laughlin | |
| 6,253,077 B1 * | 6/2001 | Burt et al. | 455/424 |
| 6,321,068 B1 * | 11/2001 | Zamat | 455/69 |
| 7,515,884 B2 * | 4/2009 | Blech et al. | 455/127.1 |
| 8,260,226 B1 * | 9/2012 | Lipshitz et al. | 455/127.2 |
| 8,447,249 B1 * | 5/2013 | Lu et al. | 455/127.2 |
| 2003/0002452 A1 | 1/2003 | Sahota | |
| 2006/0252392 A1 * | 11/2006 | Beamish et al. | 455/126 |
| 2008/0144707 A1 * | 6/2008 | Tsfati | H04B 17/13 375/224 |
| 2008/0159238 A1 * | 7/2008 | Niwano | 370/336 |
| 2009/0163155 A1 | 6/2009 | Camuffo et al. | |
| 2010/0093282 A1 * | 4/2010 | Martikkala et al. | 455/63.4 |
| 2010/0150013 A1 * | 6/2010 | Hara et al. | 370/252 |

(Continued)

FOREIGN PATENT DOCUMENTS

WO    2009023726 A2    2/2009

OTHER PUBLICATIONS

"Successively." Merriam-Webster.com. 2013. https://www.merriam-webster.com/dictionary/successively.*

(Continued)

*Primary Examiner* — Joshua A Kading
(74) *Attorney, Agent, or Firm* — Eschweiler & Associates, LLC

(57) ABSTRACT

A method for calibrating a transmitter includes operating the transmitter using a first transmitter setting; obtaining, via an external reference measuring device, a transmit power reference value indicative of a first transmit power of the transmitter corresponding to the first transmitter setting, and obtaining, using an internal measuring device of the transmitter or of a receiver associated with the transmitter, a first uncalibrated transmit power measurement value corresponding to the first transmit power. The method further includes calibrating the internal measuring device using the transmit power reference value and the first uncalibrated transmit power measurement value to provide a calibrated internal measuring device, operating the transmitter using a second transmitter setting, and obtaining, using the calibrated internal measuring device, a second transmit power measurement value indicative of a second transmit power corresponding to the second transmitter setting. Lastly, the method includes obtaining self-calibration data based on the second transmitter setting and the second transmit power measurement value, and storing the self-calibration data in a calibration data structure.

24 Claims, 11 Drawing Sheets

(56) References Cited

U.S. PATENT DOCUMENTS

2011/0286399 A1* 11/2011 Chapman et al. ............. 370/328
2011/0291857 A1* 12/2011 Hietala et al. ............ 340/870.04

OTHER PUBLICATIONS

"Measure." Merriam-Webster.com. Merriam-Webster, n.d. <http://www.merriam-webster.com/dictionary/measure>.*

"Calibrate." Merriam-Webster.com. Merriam-Webster, n.d. <http://www.merriam-webster.com/dictionary/calibrate>.*

Eamon Nash, "RF Power Calibration Aids Wireless Transmitters", www.mwrf.com/articles/print.cfm?articleid=18177, p. 1-3, Mar. 29, 2011.

Office Action dated May 26, 2014 Chinese Patent Application No. 201210089905.1.

* cited by examiner

CALIBRATION OF A TRANSMITTER WITH INTERNAL POWER MEASUREMENT

FIELD

Some embodiments according to the invention are related to a method for calibrating a transmitter. Some embodiments of the invention are related to a computer program having a program code for performing, when running on a computer, a method for calibrating a transmitter. Some embodiments according to the invention are related to a transmitter. Some embodiments are related to a calibration arrangement comprising a transmitter and a reference measuring device.

BACKGROUND

The field of wireless communications has seen a rapid evolution in the past, especially during the last two decades. During this evolution, a number of wireless communications standards were introduced, each new standard typically exploiting technological progress in order to offer superior performance. For example, the GSM (Global System for Mobile communications) standard, the EDGE (Enhanced Data rate for GSM Evolution) standard, and the CDMA (Code Division Multiple Access) standard were and still are widely used by wireless communication networks and their subscribers. While early mobile stations such as cellular phones typically supported a single wireless communication standard only, subscribers were quick to demand more versatile mobile stations or devices which can be used with wireless networks operating under different wireless communication standards.

Industrial standards are typically the result of a collaboration of several companies, standard-setting organizations, service providers, and other interested parties. For example, a collaboration between groups of telecommunications associations have founded the 3rd Generation Partnership Project (3GPP). The 3GPP is aimed at making a globally applicable third-generation (3G) mobile phone system specification within the scope of the International Mobile Telecommunications-2000 Project of the International Telecommunication Union (ITU).

Depending on the standard(s) (e.g. GSM, WCDMA) under which a mobile device is intended to operate, the 3GPP requirements define very stringent limits for certain operating parameters of mobile devices, such as cellular phones.

One of the most important transmit parameters which must virtually always be calibrated is the output power of the mobile device. Especially for output power levels and/or output power changes, the 3GPP requirements define very stringent limits. These stringent limits typically require a dedicated and individual calibration of the output power of a mobile device.

Hence, each mobile device typically needs to be calibrated during production. The main goal of factory calibration is to determine and set normalized settings for all parameters which are important for standard-compliance (e.g. 3GPP) and/or basic function of a mobile device and which show a non-predictable variation over production.

SUMMARY

Some of the embodiments according to the teachings disclosed herein provide a method for calibrating a transmitter.

A method for calibrating a transmitter according to an embodiment of the teachings disclosed herein may comprise operating the transmitter using a first transmitter setting, and obtaining, via an external reference measuring device, a transmit power reference value indicative of a first transmit power of the transmitter corresponding to the first transmitter setting. The method further comprises obtaining, using an internal measuring device of the transmitter or of a receiver associated with the transmitter, a first uncalibrated transmit power measurement value corresponding to the first transmit power, and calibrating the internal measuring device using the transmit power reference value and the first uncalibrated transmit power measurement value to provide a calibrated internal measuring device. The method also comprises operating the transmitter using a second transmitter setting, and obtaining, using the calibrated internal measuring device, a second transmit power measurement value indicative of a second transmit power corresponding to the second transmitter setting. Further, the method comprises obtaining self-calibration data based on the second transmitter setting and the second transmit power measurement value, and storing the self-calibration data in a calibration data structure.

Some of the embodiments according to the teachings disclosed herein provide a transmitter comprising a transmit chain, an internal measuring device for measuring a transmit power to obtain a transmit power measurement value indicative of a transmit power of the transmitter, a transmitter setting provider for providing at least two transmitter settings to the transmit chain, and a calibrator. The calibrator is configured to receive, from an external reference measuring device, a transmit power reference value indicative of a transmit power of the transmitter corresponding to a first one of the at least two transmitter settings. The calibrator is also configured to receive a first uncalibrated transmit power measurement value from the internal measuring device corresponding to the transmit power of the transmitter and calibrate the internal measuring device using the transmit power reference value and the first uncalibrated transmit power measurement value. Furthermore, the calibrator is configured to cause the transmitter setting provider to select a second transmitter setting of the at least two transmitter settings, obtain a second transmit power measurement value from the calibrated internal measuring device, and determine self-calibration data for the transmitter setting provider based on the second transmitter setting and the second transmit power measurement value.

Some of the embodiments according to the teachings disclosed herein provide a calibration arrangement comprising a transmitter and a reference measuring device which is external to the transmitter. The transmitter comprises a transmit chain, an internal measuring device for measuring a transmit power to obtain a transmit power measurement value indicative of a transmit power of the transmitter, a transmitter setting provider for providing at least two transmitter settings to the transmit chain, and a calibrator. The calibrator is configured to receive a transmit power reference value from the reference measuring device indicative of a transmit power of the transmitter corresponding to a first one of the at least two transmitter settings. The calibrator is also configured to receive a first uncalibrated transmit power measurement value from the internal measuring device corresponding to the transmit power of the transmitter and to calibrate the internal measuring device using the transmit power reference value and the first uncalibrated transmit power measurement value. Furthermore, the calibrator is configured to cause the transmitter setting provider to select a second transmitter setting of the at least two transmitter settings, obtain a second transmit power measurement value from the calibrated internal measuring device, and calculate self-calibration data for the transmitter setting provider based on the second transmitter setting and the second transmit power measurement value.

BRIEF DESCRIPTION OF THE DRAWINGS

Embodiments according to the teachings disclosed herein will subsequently be described with reference to the enclosed figures, in which.

DETAILED DESCRIPTION

Figure 1:
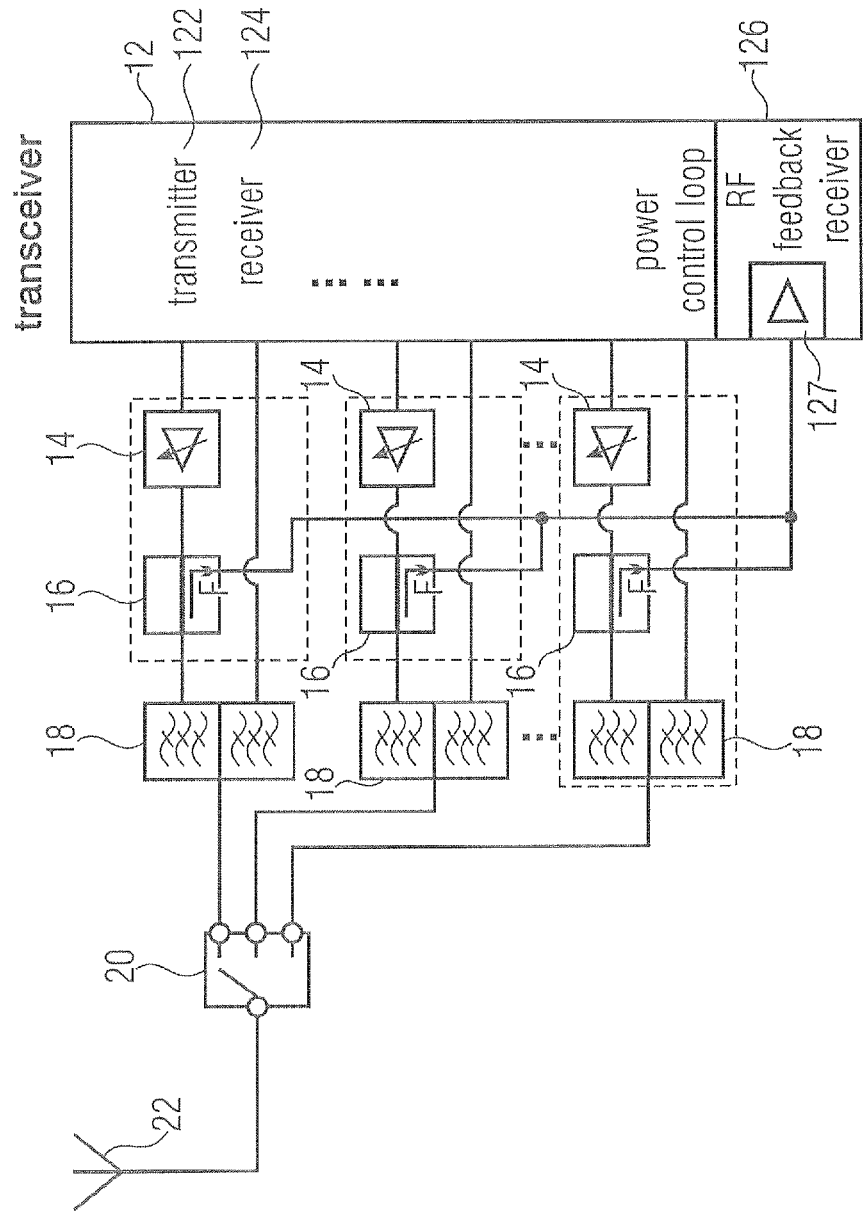
FIG. 1 shows a schematic block diagram of a multiband and multimode device.

FIG. 1 shows a schematic block diagram of a device for wireless communication supporting multiband and multimode operation. The device comprises a transceiver 12, a plurality of power amplifier (PA) subsystems 14, 16 connected to corresponding interfaces of the transceiver 12, a plurality of duplex filters (or duplexers) 18 associated with or integrated with the PA subsystems, a selection switch or multiplexer 20, and possibly an antenna 22. A transmit chain for a specific band and/or mode is typically formed by at least one of the plurality of power amplifiers 14, one of the plurality of couplers 16, and one of the plurality of duplex filters 18. Typically, the transmitter 12 also comprises a part of the transmit chain for a specific band and/or mode, such as a frequency up-converter or a mixer in order to process the transmit signal of a specific transmit chain according to the specific band and/or mode associated with that transmit chain. The transceiver 12 comprises a plurality of transmitters 122 and a plurality of receivers 124, each one of the plurality of transmitters 122 and of the plurality of receivers 124 typically being associated with one of the plurality of transmit chains. An output of a specific transmitter 122 is connected to an input of the power amplifier 14 of the associate transmit chain. An output of the power amplifier 14 is connected to an input of the coupler 16 which forwards a major part of the power to the duplex filter 18. A minor part of the power is forwarded by the coupler 16 to an RF feedback receiver 126 comprising a feedback amplifier 127. The duplex filter 18 comprises a transmitter port, a receiver port and an antenna port. The receiver 124 is connected to the receiver port of the duplex filter 18, and the selection switch 20 is connected to the antenna port of the duplex filter 18. The duplex filter 18 separates, in the frequency domain, a transmit signal provided by the transmitter 122 and the associated transmit chain from a receive signal to be handled by the receiver 124. While the duplex filters 18 of the upper two signal processing paths are separate from the arrangement comprising the power amplifier 14 and the coupler 16, in one embodiment the duplex filter 18 of the lower signal processing path is integrated with the power amplifier 14 and the coupler 16, as indicated by the box drawn in dashed line.

The selection switch 20 is controlled to connect one of the plurality of signal processing paths with the antenna 22 so that the wireless communication device operates according to a selected wireless communications standard, i.e. according to a selected band and mode defined by the selected wireless communications standard.

The output power of the transmitter and the associated transmit chain is sensed by means of the coupler 16 and fed back to the transceiver 12 either as an RF voltage or an output power dependent DC voltage if the conversion from a RF voltage to a DC voltage is done by a detector, which might be for instance part of the power amplifier's subsystem. The feedback signal is used by a power control loop to set the output power to a desired value and to keep the output power variation which for instance might occur due to temperature changes within certain limits which are given by the 3GPP requirements. The power control loop is part of the transceiver 12. It can be seen from FIG. 1 that filter element (FE) components which influence the output power such as the duplexer 18 are located after the coupler. The insertion loss of these FE components shows a part-to-part variation which typically is different for each band. As a result, each supported band typically needs to be individually calibrated to compensate for part-to-part variations and to achieve normalized output power levels for all mobile devices that are, for example, produced by a mobile device manufacturer. As a result, the transmitter calibration time depends on the number of bands and/or modes and will increase in the future since mobile devices tend to support more and more bands.

Figure 2:
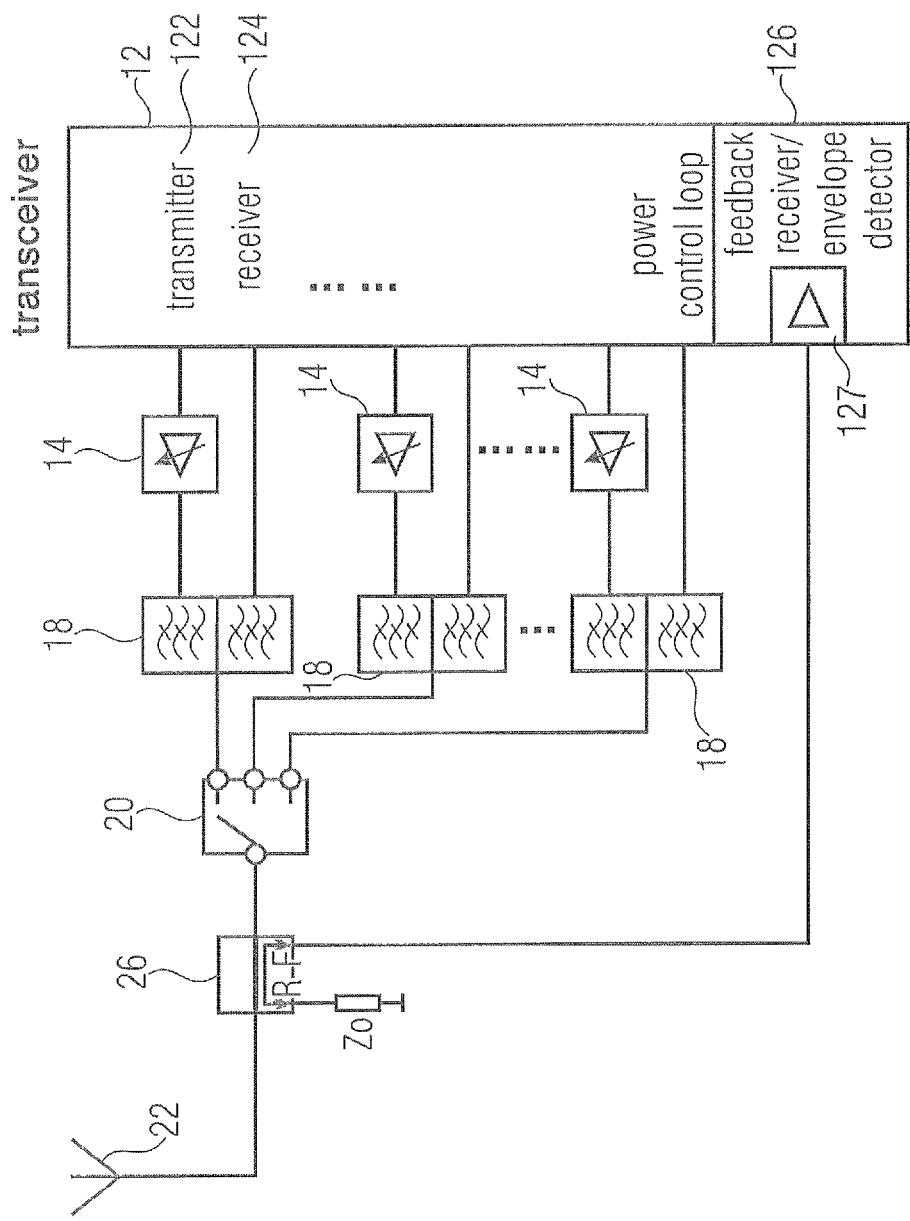
FIG. 2 shows a schematic block diagram of an alternative multiband and multimode device.

FIG. 2 shows an alternative implementation where the coupler 26 is located close to the antenna 22. With the implementation shown in FIG. 2 the coupler 26 now senses the antenna power and thus captures all variations in the transmit chain. As a consequence, the calibration procedure can be clearly simplified resulting in a shorter calibration time. Instead of calibrating each band over frequency and output power range, the dependence between antenna power and detected power is measured at one reference frequency over output power and at one reference output level over frequency. The relation between antenna power and detected power has a frequency response which is mainly given by the coupler characteristic and which can be easily compensated by taking a few points over frequency (e.g. 3-5 data points from 1,710 . . . 1,980 MHz). As a result, the calibration of the feedback path which consists of coupler 26 and power detector (e.g. feedback receiver, envelope detector) 126 is much faster than individual calibration of each band.

The dynamic range of the power detector that is used to acquire the data points for subsequent calibration may have to be considered in connection with the calibration procedure. If the dynamic range of the power detector is higher than the relevant output power range of the mobile device, then there is typically no need for additional power calibration. This is most of the time valid for 2 G operation, but for instance not for 3 G operation. In 3G mode the relevant output power range is from −57 dBm to +24 dBm, which may exceed the dynamic range of an available and affordable power detector. As a result, there is an output power range (e.g. −57 . . . −10 dBm) where the output power is set without feedback from power detector (meaning open loop operation) and an output power range (e.g. −10 . . . 24 dBm) where closed loop power control is possible since output power is within the dynamic range of the detector. The relevant output power range is thus divided into an open loop range and a closed loop range. This will cause an issue when there is a transition from the open loop region to the closed loop region if certain power accuracy targets need to be fulfilled (e.g. inner loop power control (ILPC) step accuracy in 3G). To guarantee step accuracy one option is to define an overlap range as depicted in FIG. 3.

Figure 3:
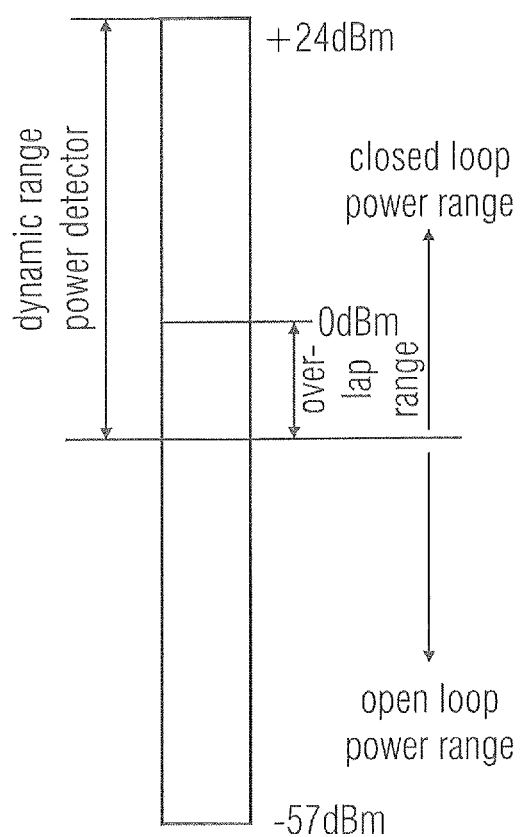
FIG. 3 is an illustration of open loop and closed loop power ranges.

In FIG. 3 it can be seen that the dynamic range of the power detector extends from −10 dBm to +24 dBm. Thus, closed loop power control is possible in this power range. If the power of the transmit signal is weaker than −10 dBm, then the power detector is not capable of producing reliable and/or meaningful power measurement data. Accordingly, the open loop power range extends from a lower limit of −57 dBm to −10 dBm where the dynamic range of the power detector begins. The overlap range extends from −10 dBm to 0 dBm.

If the output power is in the open loop power range (e.g. −12 dBm) and if there is a step to an output power level in closed loop power range (e.g. −8 dBm) then the step is typically done in an open loop manner although a result from the power detector is available. The first step from the open loop power range into the closed loop region is typically done in an open loop manner if the target power is inside the overlap power range. In the overlap range the gain of the transmit chain typically needs to be measured in addition to the power detector value. Since each band has a different gain e.g. due to different power amplifier gain and different filter element losses, each band typically needs to be individually calibrated. It would be desirable to have a procedure at one's disposition by means of which a measurement time caused by calibration of the overlap range could be reduced. In addition or in the alternative it would be desirable to enable customers to operate a mobile communications device according to the long term evolution (LTE) standard in open loop. Such an open loop operation also requires a calibration of the gain in the transmit chains in each band. Using the teachings disclosed herein may help to speed up calibration if a power detector is available e.g. to support 2G and/or 3G operation.

Figure 4:
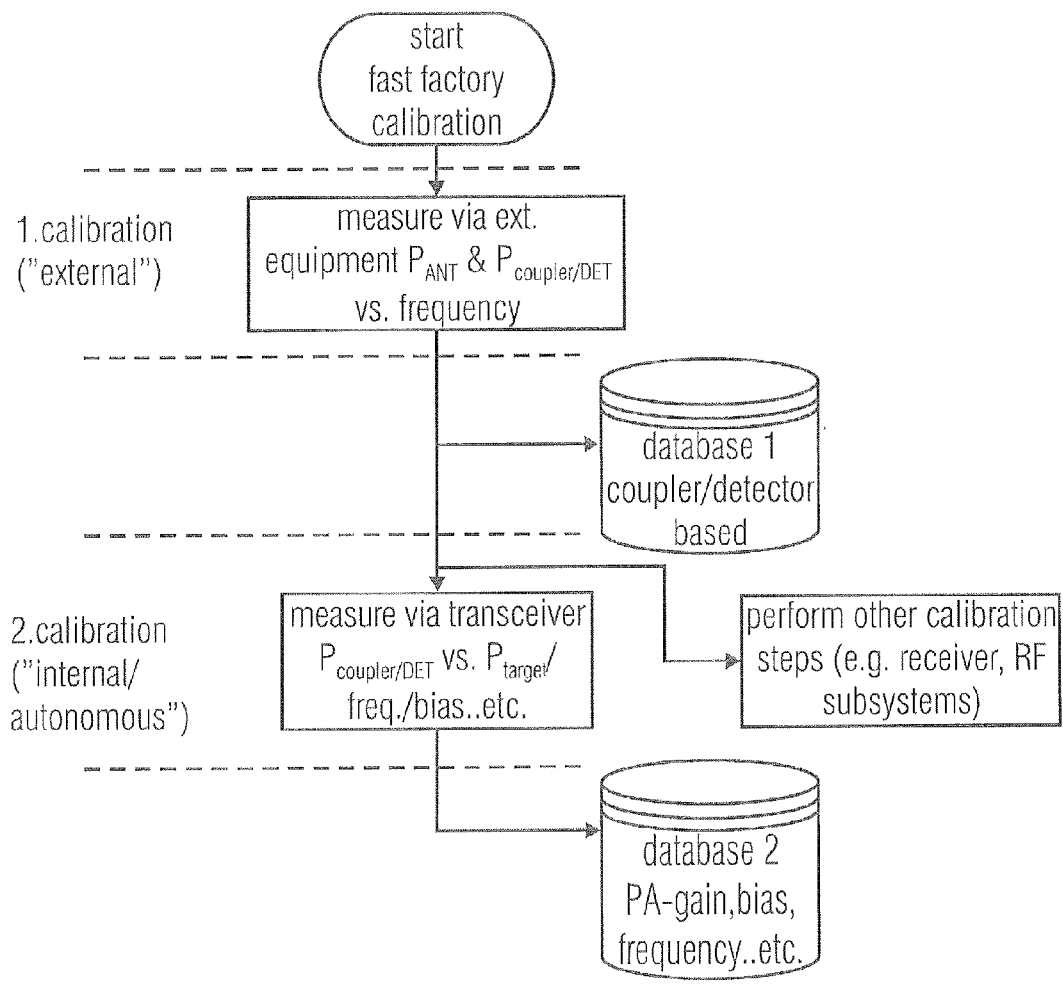
FIG. 4 shows a schematic flow diagram of a method for calibrating a transmitter.

FIG. 4 illustrates the teachings disclosed herein. In order to perform the power measurements, the transceiver itself or the transmitter in connection with an internal power measuring device is used. In production, the output power is (first) measured by external test equipment which provide power measurement values with a high precision and may be used as a reference. Using an external test equipment for performing power measurements typically is time consuming since the output power is always measured over a full transmit slot, the test equipment needs to be reconfigured when the mode (e.g. transition from GMSK to WCDMA) or the band is changed. In FIG. 4 the output power measurement by means of the external test equipment is part of a first calibration (labeled "external"). In particular, measurements are performed via external equipment, during which an antenna power $P_{ANT}$ and a coupler/detector power $P_{coupler/DET}$ are acquired for at least one frequency and at least one power setting of the transmitter. In order to measure a possible frequency dependency of the coupler/detector arrangement, a plurality of data points may be acquired at different frequencies. Hence, a deviation of the power detected by the coupler/detector (internal measuring device) with respect to the reference measurement provided by the external test equipment (external reference measuring device) may be recorded as a function of the frequency. The data points thus acquired may be stored in a first data base.

During a second calibration stage, which may be referred to as an "internal" and/or "autonomous" calibration stage, measurements are performed via the transceiver or, alternatively, via a transmitter with an associated power detector such as the coupler/detector arrangement. During the second calibration stage, the power of the coupler/detector arrangement $P_{coupler/DET}$ is measured versus various other quantities, such as a desired target power $P_{target}$, frequency, bias conditions of the power amplifier 14, etc. These measurements typically are significantly shorter in duration than a similar measurement using the external reference measuring device. This makes it possible to perform a larger number of individual measurements, for example for different combinations of target power $P_{target}$, frequency, and/or bias conditions. The results of these internal/autonomous measurements can be stored in a second database. The second database may contain values for the power amplifier gain, the bias conditions of the power amplifier 14, the frequency, etc. for each acquired data point. The second database may, for example, comprise a table similar to the following table:

| Bias voltage $V_{bias}$ | Frequency | Input power $P_{in}$ | Calibrated power measurement $P_{Coupler/DET}$ |
|---|---|---|---|
| 1.7 V | 1900 MHz | −20 dBm | −3 dBm |
| 2.0 V | 1900 MHz | −20 dBm | 0 dBm |
| 1.7 V | 1950 MHz | −20 dBm | −3.5 dBm |
| 2.2 V | 1950 MHz | −20 dBm | −1 dBm |
| . | . | . | . |
| . | . | . | . |
| . | . | . | . |

The structure of the table and the data points contained in the table are examples, only. It can be seen that the gain (i.e. the difference between the calibrated power measurement $P_{coupler/DET}$ and the input power $P_{in}$) of the transmit chain increases as the bias voltage increases from 1.7 Volts to 2.0 Volts. Furthermore, a frequency dependency of the transmit chain's gain can be observed because at 1900 MHz the gain is slightly higher than at 1950 MHz. Given a desired output power and a desired frequency, the table can be searched for an entry with approximately matching calibrated power measurement and frequency values. The bias voltage $V_{bias}$ and the input power $P_{in}$ may then be adjusted to the values indicated by the found entry.

As is illustrated in FIG. 4, other calibration steps requiring the external reference measuring device may be performed once the first calibration stage has been completed, since the external reference measuring device typically is not needed anymore at this point. The other calibration steps may be performed to calibrate e.g. the receiver(s) 124 or RF subsystems, e.g. Wireless Local Area Network (WLAN) components.

A difference between the first, external calibration stage and the second, internal/autonomous calibration stage is that the transceiver or the transmitter with the associated internal measuring device typically provides more flexibility when measuring the output power of the transmit chain than the external reference measuring device. Note that in the preceding and the following description, the term "transceiver" has been and will also be used to address an arrangement comprising a transmitter with associated internal power measuring devices. For the transceiver, the time needed to take one data point is given by the settling time of the power detector which is required as a minimum to get a stable measurement result, and by the time to reconfigure the transceiver for a subsequent measurement point (e.g. at a different bias condition or at a different frequency). In any case, it is expected that the transceiver is capable of running the measurements much faster than the external test equipment. Rough estimation shows that transceiver needs less than 150 µs per data point.

According to the teachings disclosed herein it is suggested to divide the factory calibration into two steps or stages: in a first stage the power detector is calibrated to establish an absolute power reference and in a second stage the transceiver (or the transmitter with an internal power measuring device) is configured to autonomously perform remaining power measurements. This autonomous calibration can be for instance initiated by sending a dedicated high level command to the transceiver/transmitter. After receiving this command the transceiver takes the measurement points according to a list which for instance includes the modes, frequencies and bias conditions which shall be adjusted during autonomous calibration. The result of each measurement is stored in a dedicated list which can be for instance used to calculate correction factors.

Figure 5:
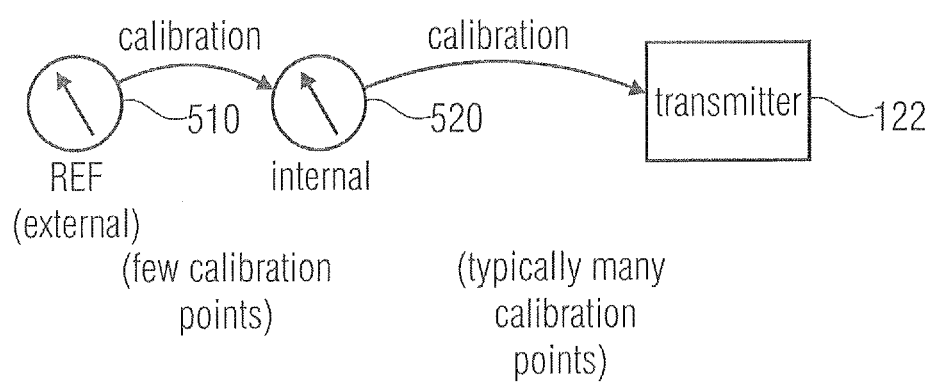
FIG. 5 illustrates a concept of a two-stage calibration of a transmitter.

FIG. 5 illustrates an aspect of the teachings disclosed herein. An external reference measuring device 510 is used to calibrate an internal measuring device 520. Typically, only a few calibration points are considered during this first stage of calibration. The calibration points may cover an intended operating range of the transmitter 122 and/or the internal measuring device 520 in a representative manner. For example, a relatively low value and a relatively high value within an operating range of a parameter of the internal measuring device may be selected to model a transfer function of the internal measuring device 520 with respect to said operating parameter within that range and possibly also outside this range. Possible operating parameters may be, but are not limited to: power, frequency, bias condition of the transmitter 122, crest factor of the signal to be measured, type of modulation, etc. Thus, even if the internal measuring device 520 has a transfer function that varies with varying operating parameters, a sufficiently precise estimation of a value of the transfer function for a given operating condition may be obtained.

The internal measuring device 520 is now calibrated with a given precision and may therefore serve as a local reference for the second calibration stage in which the transmitter 122 is calibrated. During the second calibration stage typically a larger number of calibration points are considered. As a result of the second calibration stage it can now be predicted relatively precisely which amount of power the transmitter 122 produces for a given transmitter setting and given operating parameters.

Figure 6:
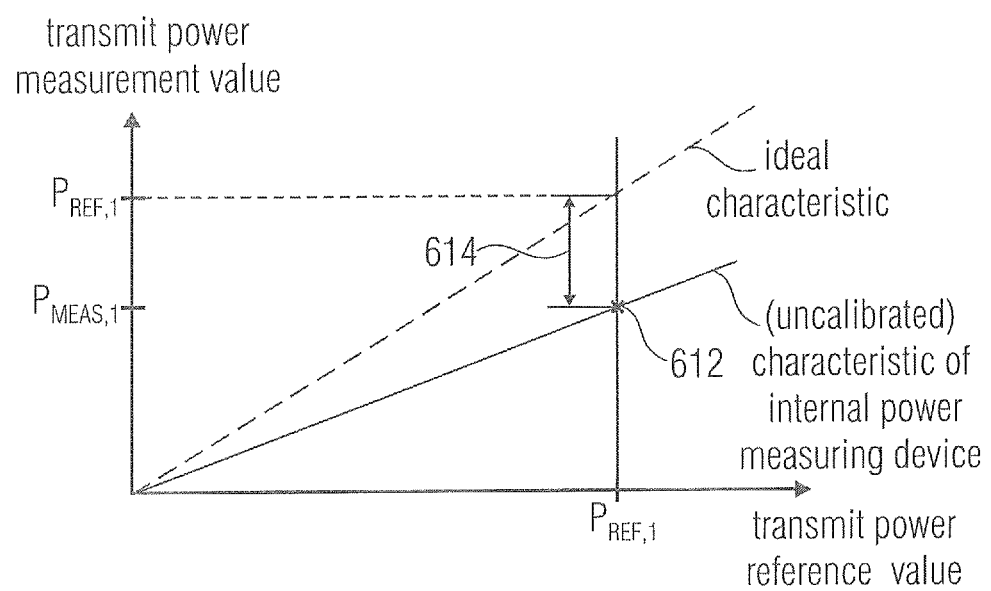
FIG. 6 shows a graph of relations between an uncalibrated/calibrated output of an internal measuring device and an output of an external reference measuring device.

FIG. 6 illustrates the first calibration stage of a calibration procedure according to the teachings disclosed herein. A relation of an uncalibrated transmit power measurement over a transmit power reference is plotted in full stroke in FIG. 6 with the transmit power reference value being represented on the abscissa and the uncalibrated transmit power measurement value on the ordinate. A second relation between an ideal transmit power measurement and the transmit power reference is plotted as a dashed line in FIG. 6. Thus, the line drawn in full stroke represents an uncalibrated characteristic of the internal power measuring device 520 and the line drawn in dashed stroke represents an ideal characteristic of the internal power measuring device 520. According to the ideal characteristic the internal measuring device would output the same value as the transmit power reference value. An aim of the first calibration stage is to provide an estimate of the uncalibrated characteristic of the internal power measuring device so that a deviation 614 between the uncalibrated characteristic and the ideal characteristic can be compensated.

FIG. 6 also shows, as a representative example, a calibration point 612 which has been acquired during the first calibration stage by operating the transmitter using a first transmitter setting and obtaining both, the transmit power reference value as provided as the external reference measuring device and the uncalibrated transmit power measurement value as provided by the internal measuring device 520. For the calibration point 612 the transmit power reference value is $P_{REF,1}$ and the uncalibrated transmit power measurement value is $P_{MEAS,1}$. Hence, the deviation 614 is $P_{REF,1}-P_{MEAS,1}$.

Figure 7:
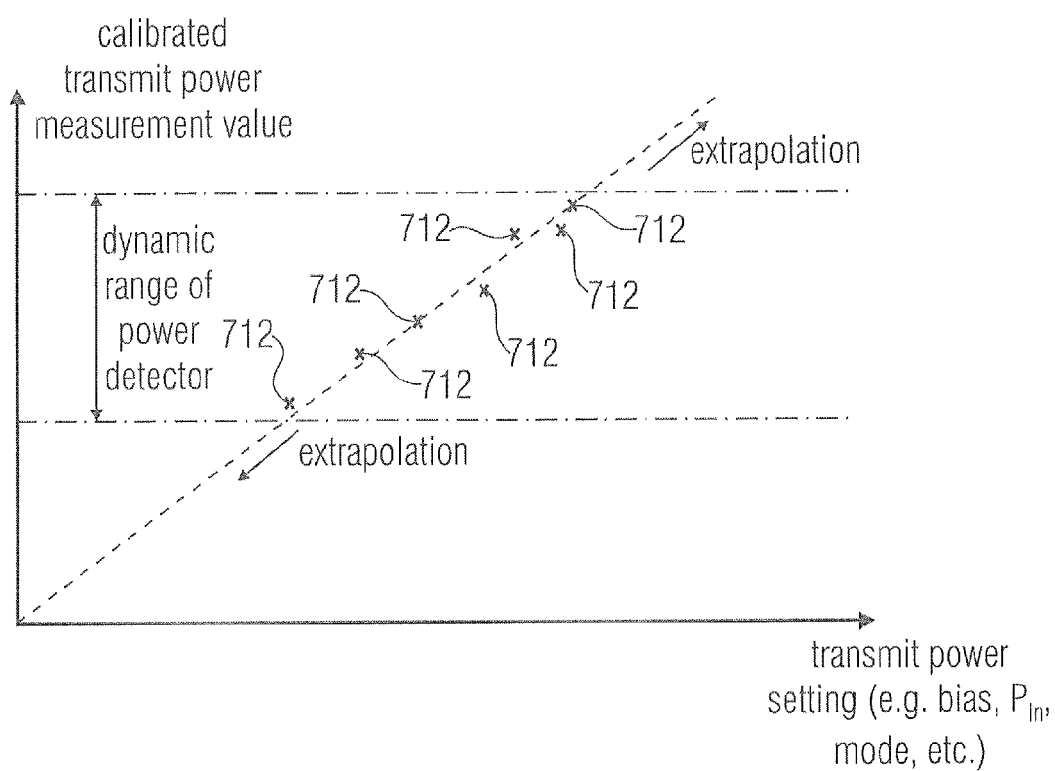
FIG. 7 shows a graph of a relation between a transmitter setting for a transmit power and a calibrated transmit power measurement value provided by a calibrated internal measuring device.

FIG. 7 illustrates the second calibration stage of the calibration procedure according to the teachings disclosed herein. A line drawn in dashed stroke represents a relation between a calibrated transmit power measurement value and a transmit power setting. This relation is not initially known, but can be estimated by taking calibration points 712. Having obtained one or more calibration points 712, it is possible to estimate a required transmit power setting for a desired target power $P_{target}$. To this end, the calibration points 712 may be interpolated between a first calibration point 712 and an adjacent calibration point 712. For example, a linear interpolation, a cubic interpolation or a spline interpolation may be used. It is also possible to determine an approximation function by evaluating all calibration points (or a selection therefrom) in a least squares approach. In FIG. 7, the dashed line approximately represents a linear approximation function obtained by using a least squares approach. Other methods for fitting an approximation function to the calibration points 712 may also be used, for example, a non-linear function.

In FIG. 7, a dynamic range of the internal measuring device, i.e. the power detector, is limited as indicated by two horizontal, dash-dotted lines. Above and beneath the dynamic range of the internal measuring device, typically no reliable and meaningful power readings may be obtained. By extrapolating the approximation function outside the dynamic range of the internal measuring device, it is typically possible to obtain sufficiently precise transmit power settings for given desired target power values $P_{target}$.

Figure 8:
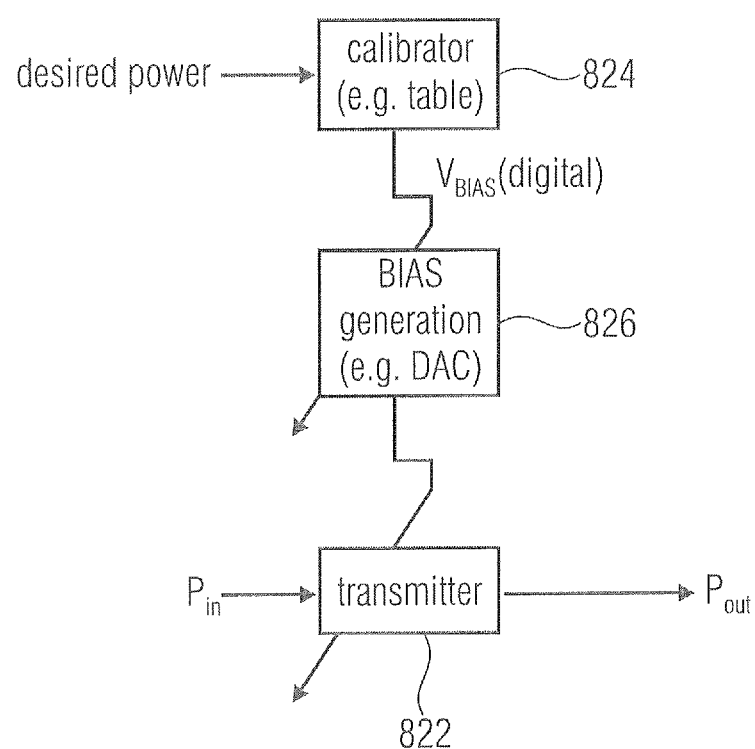
FIG. 8 shows a schematic block diagram of a transmit power control of a transmitter.

FIG. 8 shows a schematic block diagram of components that are involved in controlling a transmitter 822. In a given operating condition, the transmitter 822 shall provide a specific desired power value. The desired power value is input to a calibration module 824 which may be, for example, a calibration table. The calibration module 824 may output a digital value for a bias voltage $V_{bias}$ which is then provided to a bias generation unit 826, such as a digital-to-analog converter. The calibration module 824 has been configured during the second stage of the calibration procedure so that it maps a desired power value to an appropriate bias voltage $V_{bias}$ that causes the transmitter 822 to output a transmit signal having the desired power value. The configuration of the calibration module 824 may comprise populating the calibration table with a plurality of entries. For a given input value representing a desired power value, at least one entry may be selected within the calibration table which is close to the desired power value. This table entry may then be used to determine or calculate the bias voltage $V_{bias}$. As an alternative to the calibration table, a calibration mapping function may be used, which may be defined by a set of coefficients.

The bias generation 826 provides an analog bias voltage to the transmitter 122 on the basis of the digital bias voltage $V_{bias}$ produced by the calibration module 824. As the bias voltage $V_{bias}$ may typically effect a gain of a power amplifier that is a part of the transmitter 822, a variation of the bias voltage changes a relation between an output power value $P_{out}$ and an input power value $P_{in}$ of the transmitter 822.

The calibration module 824 could also implement a multivariate mapping of a plurality of input values to a plurality of output values so that the output signal of the transmitter 822 has the desired power value.

Note that instead of or in addition to the bias voltage $V_{bias}$ other parameters could also be determined by the calibration module 824. For example, the input power $P_{in}$ for the transmitter 822 could be adjusted.

Figure 9:
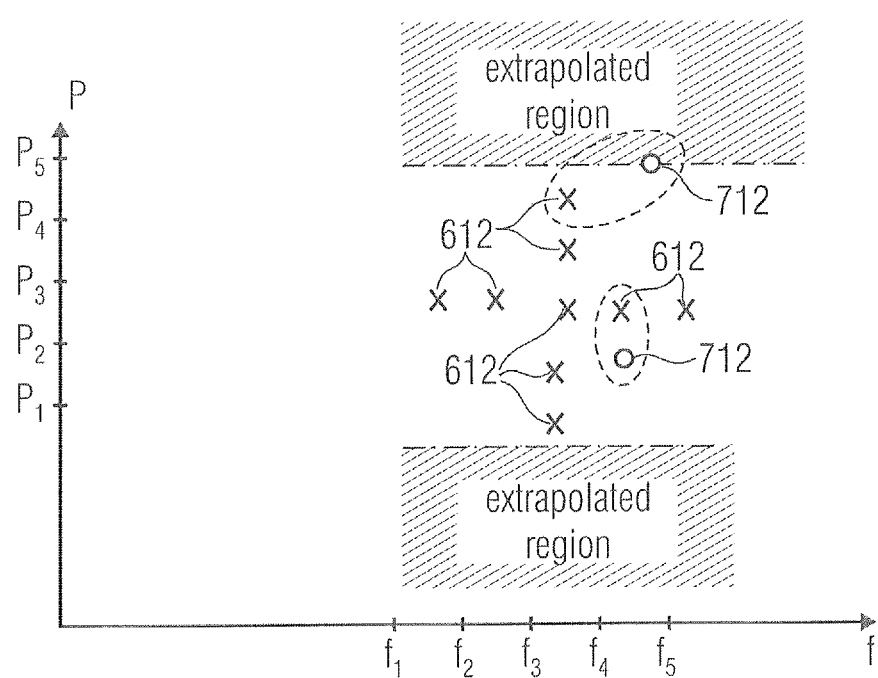
FIG. 9 illustrates a frequency-power plane and a plurality of data points in the frequency-power plane collected during first and second stages of the calibration procedure.

FIG. 9 shows a frequency-power plane in which a plurality of first calibration points considered during the first calibration stage are depicted. In addition, two calibration points 712 are also shown in FIG. 9. The first calibration points 612 are arranged in a cross-like manner so that selected combinations of five frequencies $f_1$ to $f_5$ and of five output power values $P_1$ to $P_5$ are considered during the first calibration stage. Although only a limited number of calibration points are used during the first calibration stage, a significant region of the frequency-power plane can be covered using the calibration points. Note that for the frequency $f_3$ calibration points for all five power values $P_1$ to $P_5$ are selected. Likewise, for the power level $P_3$ calibration points covering the five frequencies $f_1$ to $f_5$ are considered.

During the second calibration stage and in particular during the calibration using a second calibration point 712, the closest first calibration point 612 may be considered in order to provide a calibration value for the internal measuring device 520. In order to determine which one of the plurality of first calibration points 612 is closest to a current second calibration point 712, a distance between two calibration points in the frequency-power plane may be defined and determined. For example, the distance measure may be defined as a weighted geometric average of the frequency difference and the power value difference.

As mentioned above in the context of the description of FIG. 7, the internal measuring device 520 has a dynamic range. However, depending on the wireless communications standard(s) under which the transmitter is intended to operate, the transmitter 122, 822 may be required to output a signal having a power value outside of the dynamic range of the internal measuring device. During the second stage of the calibration procedure, the calibration results obtained for the second calibration points in the calibration region may be extrapolated to an extrapolated region outside of the calibration region. The calibration region may, for example, be defined as the rectangle limited by $f_1$, $f_5$, $P_1$, and $P_5$. The extrapolation to the extrapolated region may be useful if the transmitter meets for example a certain linearity criterion. Especially more recent wireless communication standards, such as those which are commonly referred to as 3G, make high demands on the transmitters linearity, so that the criterion of sufficient linearity may typically be considered fulfilled when the transmitter operates under one of these standards.

According to an optional aspect provided by the teachings disclosed herein, the calibration of the internal measuring device or the power detector is done during 2G calibration (2G bands cover the frequency range from 824 MHz to 1910 MHz) and the calibration of the 3G part(s) is autonomously done by the transmitter or the transceiver.

The autonomous calibration may be useful in connection with an LTE mode if a mobile device manufacturer prefers to run LTE in open loop over the complete power range, since the transmit gain can be calibrated extremely fast for all output power levels which fall into the dynamic range of the internal measuring device or the power detector. Furthermore, output power levels which are outside the dynamic range of the internal measuring device or the power detector can typically be calibrated by means of the above mentioned extrapolation.

Figure 10:
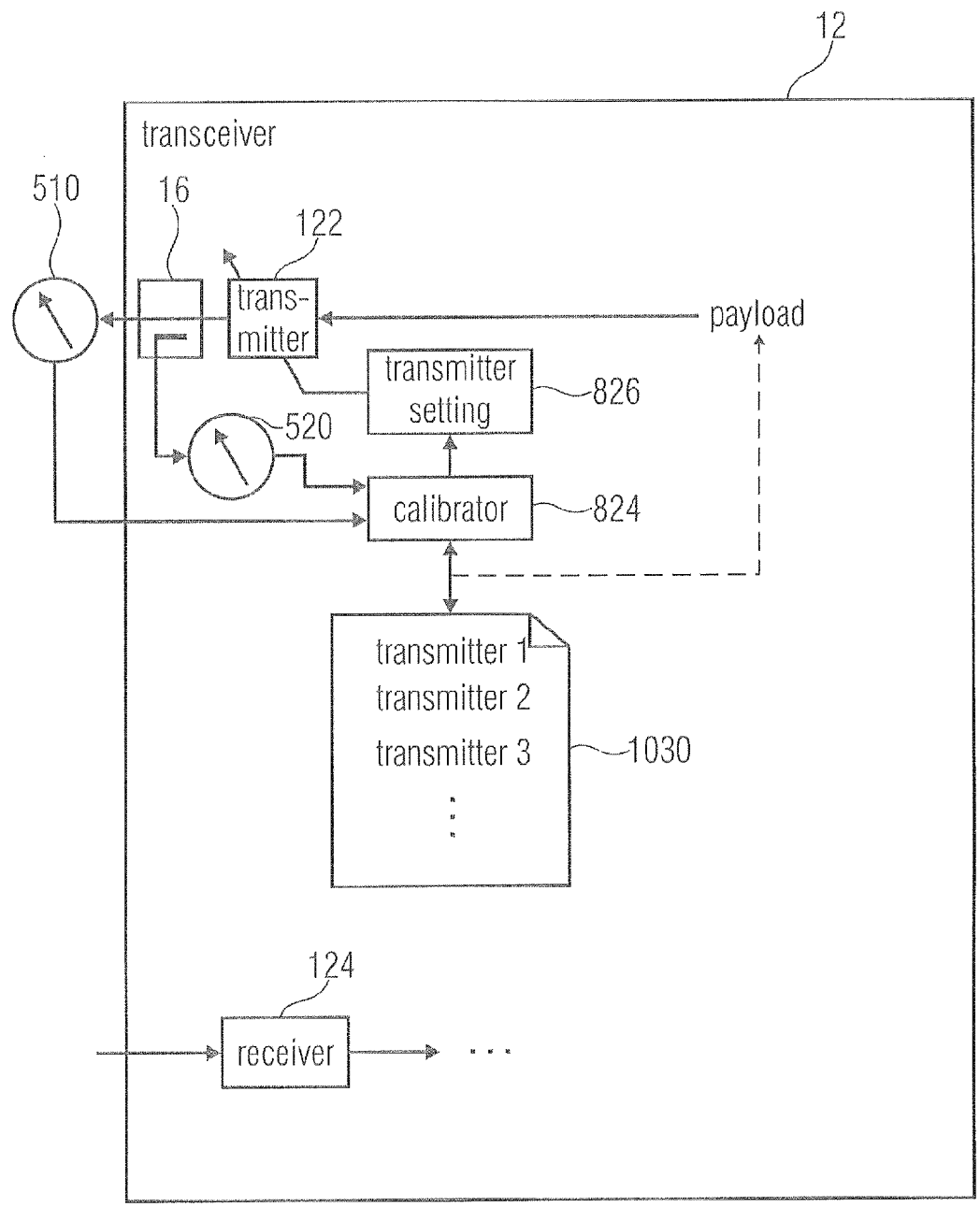
FIG. 10 shows a schematic block diagram of a calibration arrangement.

FIG. 10 shows a schematic block diagram of a transceiver 12 in order to illustrate the two stage calibration procedure according to the teachings disclosed herein. The transceiver 12 comprises the transmitter 122 and the receiver 124. The receiver 124 is connected at its input side to an antenna, possibly via a duplex filter 18 as illustrated in FIGS. 1 and 2. At an output side of the receiver 124, the received signal is provided to be used by downstream signal processing units. Due to the duplex filter 18, the receiver 124 can typically not be used as the internal measuring device 520. In other transceiver architectures that do not comprise a duplex filter but rely on e.g. time division duplexing (TDD), the receiver 124, or a part thereof, could indeed be used as the internal measuring device 520.

The transmitter 122 receives a payload signal having an input power value at its input. During the calibration procedure, the payload signal may be defined by a transmitter setting contained in a list of calibration transmitter settings 1030.

The transmitter 122 processes the payload signals to generate a transmit signal. The transmit signal is, during a calibration phase of the transceiver 12, forwarded to an external reference measuring device 510. A part of the transmit signals power is provided to the internal measuring device 520 by means of a coupler 16. The outputs of the external reference measuring device 510 and of the internal measuring device 520 are forwarded to a calibrator 824. Note that the external reference measuring device 510 is typically needed during the first calibration stage only. The calibrator 824 may then compare the results provided by the external reference measuring device 510 and the internal measuring device 520 in order to determined by how much the result provided by the internal measuring device 520 deviates from the result provided by the external reference measuring device 510. In this manner, a plurality of correction values for individual calibration points or a correction function may be determined. Using the plurality of correction values or the correction function it is now possible to obtain a precise power measurement using only the internal measuring device 520.

In the course of the second calibration stage, the transmitter 122 may be configured to successively operate according to one of a plurality of transmitter settings defined in the list of transmitter settings 1030. After the first calibration stage has been completed, the calibrator 824 is capable of translating or converting an output value provided by the internal measuring device 520 into a corrected value which is typically sufficiently close to a power measurement value that would have been provided by the external reference measuring device 510, if the external reference measuring device 510 was still connected to the transmitter 122. Initially, the calibrator 824 may be set to initial calibration values. In the course of the second calibration stage, individual calibration points defined in the list 1030 may be successively supplied to the calibrator 824, which forwards (initially uncalibrated, or calibrated according to initial value) transmitter settings to a transmitter setting provider 826, such as a digital-to-analog converter. The transmitter setting provider 826 controls one or more of the transmitter's operating parameters, such as the bias voltage $V_{bias}$. Depending on a current value of the operating parameters, the transmitter 122 generates a transmit signal having a certain power value. The power value is determined by the internal measuring device 520 and may be stored along with the transmitter settings in the list 1030 or in a dedicated database.

During autonomous calibration, one calibration point, i.e. one entry in the list of transmitter settings 1030, may be processed during one time slot as defined by wireless communications standards. As an alternative, which may speed up the autonomous calibration, the slot timing used during the autonomous calibration is different from the slot timing which is defined by e.g. the 3GPP standard. To shorten calibration time, it is suggested to reduce the slot length (e.g. 666.7 µs for WCDMA FDD) such that the length is limited by the time required to take a data point. As mentioned above, it is estimated that one data point can be taken in less than 150 µs during autonomous calibration.

In an operation phase of the transceiver 12, the external reference measuring device 510 will be replaced by an antenna, and the connection between the external reference measuring device 510 and the calibrator 824 will be removed. The location of the coupler 16 close to the antenna is optional. In fact, the calibration procedure assumes such an implementation as typical baseline architecture, since an absolute power reference can be fast and easily established.

Figure 11:
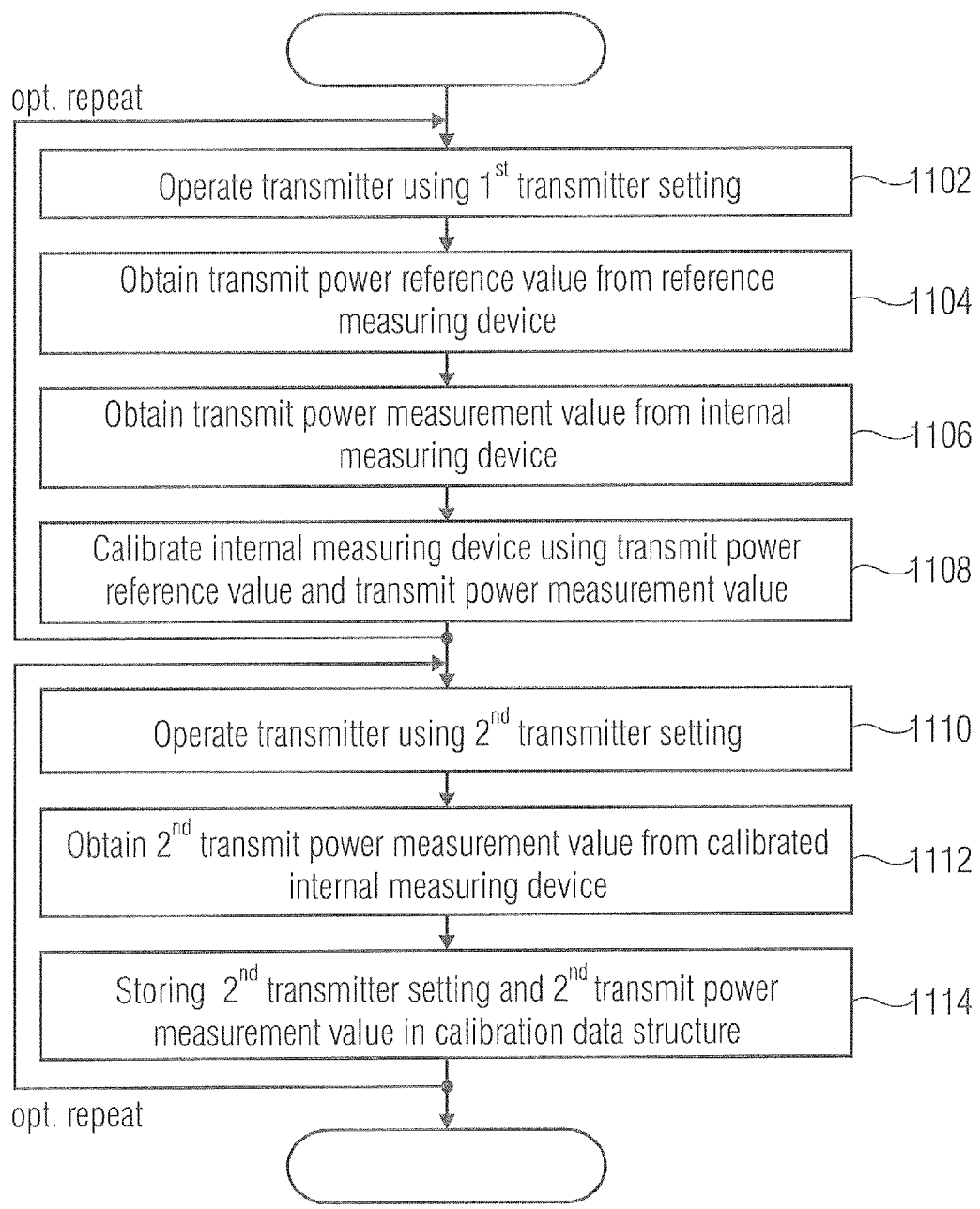
FIG. 11 shows a schematic flow diagram of a method for calibrating a transmitter.

FIG. 11 shows a schematic flow diagram of a method for calibrating a transmitter according to the teachings disclosed herein. At 1102 the transmitter is operated using a first transmitter setting. The first transmitter setting may comprise or define specific values or e.g. input power, bias voltage, frequency, and/or type of modulation. While the transmitter is operated using the first transmitter setting, a transmit power reference value is obtained from an external reference measuring device 1104. The external reference measuring device is temporarily connected to the transmitter for the duration of the first calibration stage (action 1104). While the transmitter still operates using the first transmitter setting, a transmit power measurement value is obtained from an internal measuring device, at 1106. The actions 1104 and 1106 may be performed concurrently. With the transmit power reference value obtained from the external reference measuring device and the transmit power measurement value obtained from the internal measuring device, the internal measuring device may now be calibrated, as indicated at action 1108.

During a second calibration stage, the transmitter is operated using a second transmitter setting 1110. The second transmitter setting is typically different from the first transmitter setting, but may also be identical to the first transmitter setting. At action 1112, a second transmit power measurement value is obtained from the internal measuring device which is by now calibrated due to the previous action 1108. The second transmitter setting and the second transmit power measurement value are then (at 1114) stored in a calibration data structure for future reference during an operation of the transmitter.

While the actions 1102 to 1108 are typically performed a few times, only, the actions 1110 to 1114 typically take less time to perform and are performed significantly more often than the actions 1102 to 1108.

According to the teachings disclosed herein, fast calibration is possible, which reduces calibration time, especially if the number of bands supported by a transmitter is increasing. A complexity of a calibration software on the customer's side is reduced since power measurements and post-processing are done by modem; merely the absolute power needs to be established by customer by taking a few data points. A method for calibrating a transmitter according to the teachings disclosed herein supports parallel calibration and testing. Hence, during autonomous transmitter calibration, the test equipment can be used to perform other calibration steps, e.g. receiver calibration, calibration of radio frequency subsystems (WLAN, BT . . . etc).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a BlueRay, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A method for calibrating a transmitter, the method comprising:
    operating the transmitter using a first transmitter setting;
    obtaining, via an external reference measuring device external to the transmitter, a transmit power reference value that is a first transmit power of the transmitter corresponding to the first transmitter setting as measured by the external reference measuring device;
    obtaining, using an internal measuring device of the transmitter or using a receiver associated with the transmitter, a first uncalibrated transmit power measurement value that is the first transmit power as measured by the internal measuring device or the receiver;
    calibrating the internal measuring device based at least in part on a first database comprising the transmit power reference value and the first uncalibrated transmit power measurement value to provide a calibrated internal measuring device configured to calibrate an output power of the transmitter;
    operating the transmitter using a second transmitter setting;
    obtaining, using the calibrated internal measuring device independently of the external reference measuring device, a second transmit power measurement value that is a second transmit power corresponding to the second transmitter setting as measured by the calibrated internal measuring device;
    obtaining calibration data based on the second transmitter setting and the second transmit power measurement value independently of the external reference measuring device; and
    storing the calibration data in a calibration data structure.

2. The method according to claim 1, further comprising:
    receiving a command at the transmitter instructing the transmitter to perform the actions of operating the transmitter using the second transmitter setting, of obtaining the second transmit power measurement value, and of obtaining and storing the calibration data.

3. The method according to claim 1, wherein the second transmitter setting is a calibration transmitter setting,
    wherein the second transmit power measurement value is a calibration transmit power measurement value,
    wherein the actions of operating the transmitter using a second transmitter setting and of obtaining a second transmit power measurement value are repeated for a plurality of different second transmitter settings, and
    wherein the calibration data are obtained based on the plurality of different second transmitter settings and the calibration transmit power measurement values obtained for the plurality of different second transmitter settings.

4. The method according to claim 3, further comprising:
    evaluating a list indicative of the plurality of calibration transmitter settings.

5. The method according to claim 4, wherein the list specifies at least one of a modulation technique, an access scheme, a frequency, and a bias condition for the plurality of calibration transmitter settings.

6. The method according to claim 1, wherein the actions of operating the transmitter using a first transmitter setting, obtaining the transmit power reference value, and obtaining the transmit power measurement value are repeated a plurality of times for a plurality of external calibration transmitter settings, wherein the method further comprises:
    storing a plurality of measurement calibration points each being based on a transmit power reference value and a corresponding uncalibrated transmit power measurement value; and
    wherein the action of obtaining the second transmit power measurement value comprises selecting a calibration point of the plurality of measurement calibration points as a support calibration point for the calibrated internal measuring device in order to take into account a local calibration of the internal measuring device in the vicinity of the selected calibration point.

7. The method according to claim 1, further comprising:
    calculating a correction factor for the second transmitter setting based on the calibration data and the second transmitter setting.

8. The method according to claim 7, further comprising:
    extrapolating the correction factor to a range of second transmitter settings exterior to a measurement range of the internal measuring device.

9. The method according to claim 1, wherein the actions of operating the transmitter using the second transmitter setting and obtaining the second transmit power measurement value are performed in a time span having a duration that is shorter than a duration of a time slot used during normal operation of the transmitter.

10. The method according to claim 9, wherein the time span is determined by a time required to take a data point comprising the second transmitter setting and the second transmit power measurement value.

11. The method according to claim 9, wherein a reduced duration of a time slot, during which the actions of operating the transmitter using the second transmitter setting and obtaining the second transmit power measurement value are performed, has a duration between 100 µs and 300 µs.

12. The method according to claim 1, wherein the actions of obtaining the transmit power reference value and obtaining the first uncalibrated transmit power measurement value are performed while the transmitter is being operated using a first set of parameters defined by a specification of a first wireless communication standard; and
    wherein the action of obtaining the second transmit power measurement value and storing calibration data based on the second transmitter setting and the second transmit power measurement value are performed while the transmitter is being operated using a second set of parameters defined by a specification of a second wireless communications standard;
    wherein the first wireless communications standard differs from the second wireless communications standard with respect to at least one of: carrier frequencies, number of available carrier frequencies, power range, power envelope, spectral mask, and type of modulation.

13. The method according to claim 1, further comprising:
using the external reference measuring device to perform a calibration procedure of another transmitter concurrently with performing at least one of the actions of operating the transmitter using the second transmitter setting, obtaining the second transmit power measurement value, and storing the calibration data.

14. The method according to claim 1, further comprising:
connecting the external measuring device with the transmitter prior to the action of obtaining the transmit power reference value;
disconnecting the external measuring device from the transmitter after one or more execution of the action of obtaining the first transmit power reference value; and
connecting the external measuring device with another transmitter to perform the action of obtaining the transmit power reference value of the another transmitter.

15. A non-transitory storage medium having a program code for performing, when running on a computer, a method for calibrating a transmitter, the method comprising:
configuring the transmitter to operate using a first transmitter setting;
obtaining, via an external reference measuring device external to the transmitter, a transmit power reference value that is a first transmit power of the transmitter corresponding to the first transmitter setting as measured by the external reference measuring device;
obtaining, using an internal measuring device of the transmitter or using a receiver associated with the transmitter, a first uncalibrated transmit power measurement value that is the first transmit power as measured by the internal measuring device or the receiver;
calibrating the internal measuring device based at least in part on a first database comprising the transmit power reference value and the first uncalibrated transmit power measurement value to provide a calibrated internal measuring device;
configuring the transmitter to operate using a second transmitter setting;
obtaining, using the calibrated internal measuring device independently of the external reference measuring device, a second transmit power measurement value that is a second transmit power corresponding to the second transmitter setting as measured by the calibrated internal measuring device;
obtaining calibration data based on the second transmitter setting and the second transmit power measurement value independently of the external reference measuring device, wherein the calibration data associates a plurality of power measurements with a plurality of frequencies; and
storing the calibration data in a calibration data structure.

16. A method for calibrating a transmitter, the method comprising:
operating the transmitter using a first transmitter setting;
obtaining, via an external reference measuring device external to the transmitter, a transmit power reference value that is a first transmit power corresponding to the first transmitter setting as measured by the external reference measuring device;
obtaining, using an internal measuring device of the transmitter or using a receiver associated with the transmitter, a first uncalibrated transmit power measurement value that is the first transmit power as measured by the internal measuring device or the receiver;
calibrating the internal measuring device based at least in part on a first database comprising the transmit power reference value and the first uncalibrated transmit power measurement value to provide a calibrated internal measuring device;
receiving a command at the transmitter instructing the transmitter to operate the transmitter using a plurality of calibration transmitter settings;
obtaining, using the calibrated internal measuring device independently of the external reference measuring device, a plurality of calibration transmit power measurement values that are a plurality of calibration transmit powers corresponding to the plurality of calibration transmitter settings, respectively, as measured by the calibrated internal measuring device; and
obtaining calibration data based on the plurality of calibration transmitter settings and the plurality of calibration transmit power measurement values independently of the external reference measuring device and storing the calibration data in a calibration data structure.

17. A transmitter, comprising:
a transmit chain comprising a transmitter component and a power amplifier;
an internal measuring device configured to measure a transmit power to obtain a transmit power measurement value that is a transmit power of the transmitter as measured by the internal measuring device;
a transmitter setting component configured to provide at least two transmitter settings to the transmit chain;
a calibrator component configured to:
receive, from an external reference measuring device external to the transmitter, a transmit power reference value that is a transmit power of the transmitter corresponding to a first one of the at least two transmitter settings, as measured by the external reference measuring device;
receive a first uncalibrated transmit power measurement value from the internal measuring device that is the transmit power of the transmitter as measured by the internal measuring device;
calibrate the internal measuring device based at least in part on a first database comprising the transmit power reference value and the first uncalibrated transmit power measurement value;
cause the transmitter setting component to select a second transmitter setting of the at least two transmitter settings;
obtain a second transmit power measurement value from the calibrated internal measuring device independently of the external reference measuring device, wherein the second transmit power measurement value is a transmit power of the transmitter corresponding to the second transmitter setting, as measured by the calibrated internal measuring device; and
determine calibration data for the transmitter setting component based on the second transmitter setting and the second transmit power measurement value independently of the external reference measuring device, wherein the calibration data maps at least one target output power level to an associated bias voltage.

18. The transmitter according to claim 17, further comprising a command interface configured to receive a command instructing the transmitter to operate the transmitter in the second transmitter setting and obtain the second transmit power measurement value from the internal measuring device.

19. The transmitter according to claim 17, wherein the calibrator component is further configured to cause the transmitter setting component to successively select a plurality of calibration transmitter settings, operate the transmitter according to the plurality of calibration transmitter settings, and obtain a plurality of calibration transmit power measurement values corresponding to the plurality of calibration transmitter settings from the internal measuring device.

20. The transmitter according to claim 19, wherein the calibrator component is further configured to evaluate a list specifying a plurality of calibration settings, wherein the list specifies at least one of a modulation technique, an access scheme, a frequency, and a bias condition for each one of the plurality of calibration settings.

21. The transmitter according to claim 17, wherein the calibrator component is configured to operate the transmitter using the second transmitter setting and obtain the second transmit power measurement value in a time span having a duration that is shorter than a duration of a time slot used during normal operation of the transmitter.

22. A calibration system comprising a transmitter in combination with a reference measuring device that is external to the transmitter, the transmitter comprising:
a transmit chain comprising a transmitter component and a power amplifier;
an internal measuring device configured to measure a transmit power to obtain a transmit power measurement value that is a transmit power of the transmitter as measured by the internal measuring device;
a transmitter setting component configured to provide at least two transmitter settings to the transmit chain;
a calibrator component configured to:
receive a transmit power reference value from the reference measuring device that is external to the transmitter, that is a transmit power of the transmitter corresponding to a first one of the at least two transmitter settings as measured by the reference measuring device,
receive a first uncalibrated transmit power measurement value from the internal measuring device that is the transmit power of the transmitter as measured by the internal measuring device or the receiver;
calibrate the internal measuring device based at least in part on a first database comprising the transmit power reference value and the first uncalibrated transmit power measurement value;
cause the transmitter setting component to select a second transmitter setting of the at least two transmitter settings;
obtain a second transmit power measurement value from the calibrated internal measuring device independently of the external reference measuring device, wherein the second transmit power measurement value is a transmit power of the transmitter corresponding to the second transmitter setting, as measured by the calibrated internal measuring device; and
calculate calibration data for the transmitter setting component based on the second transmitter setting and the second transmit power measurement value independently of the external reference measuring device, wherein the calibration data maps at least one target output power level to an associated bias voltage.

23. A calibration system, comprising:
means for providing a transmit signal;
means for measuring a transmit power of the transmit signal;
means for controlling the transmitting means to transmit the transmit signal using a first transmitter setting selected from at least two transmitter settings;
means for calibrating the measuring means to obtain a calibrated measuring means, the calibrating means being configured to receive a transmit power reference value from an external reference measuring device that is external to the transmitter, wherein the transmit power reference value is a transmit power of the means for providing the transmit signal corresponding to a first transmitter setting of the at least two transmitter settings as measured by the external reference measuring device, and to obtain a corresponding first uncalibrated transmit power measurement value from the measuring means, wherein the first uncalibrated transmit power measurement value is the transmit power of the means for providing the transmit signal corresponding to the first transmitter setting as measured by the measuring means, and also configured to calibrate the measuring means based at least in part on a first database comprising the received transmit power reference value and the received first uncalibrated transmit power measurement value;
means for performing an autonomous calibration procedure independently of the external reference measuring device configured to set the controlling means to operate the transmitting means using a second transmitter setting selected from the at least two transmitter settings, to obtain a second transmit power measurement value from the calibrated means for measuring, wherein the second transmit power measurement value is the transmit power of the means for providing the transmit signal corresponding to the second transmitter setting as measured by the measuring means, and calibrate the output power of the transmitting means based on the second transmitter setting and the second transmit power measurement value independently of the external reference measuring device.

24. The calibration system according to claim 23, further comprising a means for storing calibration data, the calibration data being based on the second transmitter setting and the second transmit power measurement value.

* * * * *